United States Patent [19]

Gabriel

[11] 4,445,327
[45] May 1, 1984

[54] HYDRAULIC CYCLO-JET ENGINE

[76] Inventor: Naeem B. Gabriel, 615 Greenwood Ave., Apt. #4, Trenton, N.J. 08609

[21] Appl. No.: 333,909

[22] Filed: Dec. 23, 1981

[51] Int. Cl.³ .................. F15B 7/08; F15B 15/08; F15B 15/18
[52] U.S. Cl. .................. 60/325; 415/81; 415/202
[58] Field of Search .......... 60/325, 484, 485; 415/80, 81, 202

[56] References Cited

U.S. PATENT DOCUMENTS

| | | | |
|---|---|---|---|
| 834,371 | 10/1906 | Duc, Jr. | 415/80 |
| 1,329,626 | 2/1920 | Oman | 415/80 |
| 3,385,058 | 5/1968 | Root et al. | 60/485 |
| 4,030,856 | 6/1977 | Eskeli | 415/80 |

FOREIGN PATENT DOCUMENTS

| | | | |
|---|---|---|---|
| 66430 | 8/1914 | Austria | 415/81 |
| 16800 | 2/1913 | France | 60/325 |
| 17600 | 6/1902 | Sweden | 415/80 |

*Primary Examiner*—John J. Vrablik

[57] ABSTRACT

This engine is designed to be operated by diversity of methods. It comprises a master cylinder which has the shape of the capital letter "T". Oil is compressed in this cylinder from its vertical line. The two opposite sides of this master cylinder have conical channels in them. Next to each side of the master cylinder and outside it, there is a rotating disc with poaches or pockets in it. Deep in each poach there is a draining duct which opens in the thickness of that rotating disc. The two rotating discs are attached together by an axle crossing the master cylinder from one side to another. As the assembly is tight, and if an amount of oil is compressed in the master cylinder through its vertical or pumping line, then the oil will have no passage out of it except through the conical channels of the cylinder's sides.

And as oil gushes under pressure from the sides it encounters the rotating disc with the poaches, and thus forces it to spin to be able to get out from it. Also the strong thrust with which the oil leaves the rotating disc under the pressure, (wherein it leaves it with an angle) resembles a jet action which adds an extra spin to the rotating disc, and also restricts the direction of its rotation, and from the rotating axle we get our source of motion.

It should be noticed here that there is a multiplication factor to the forces applied according to what is known in hydrodynamics as "Pasqual's Rule", upon which the design of the engine is based upon.

2 Claims, 11 Drawing Figures

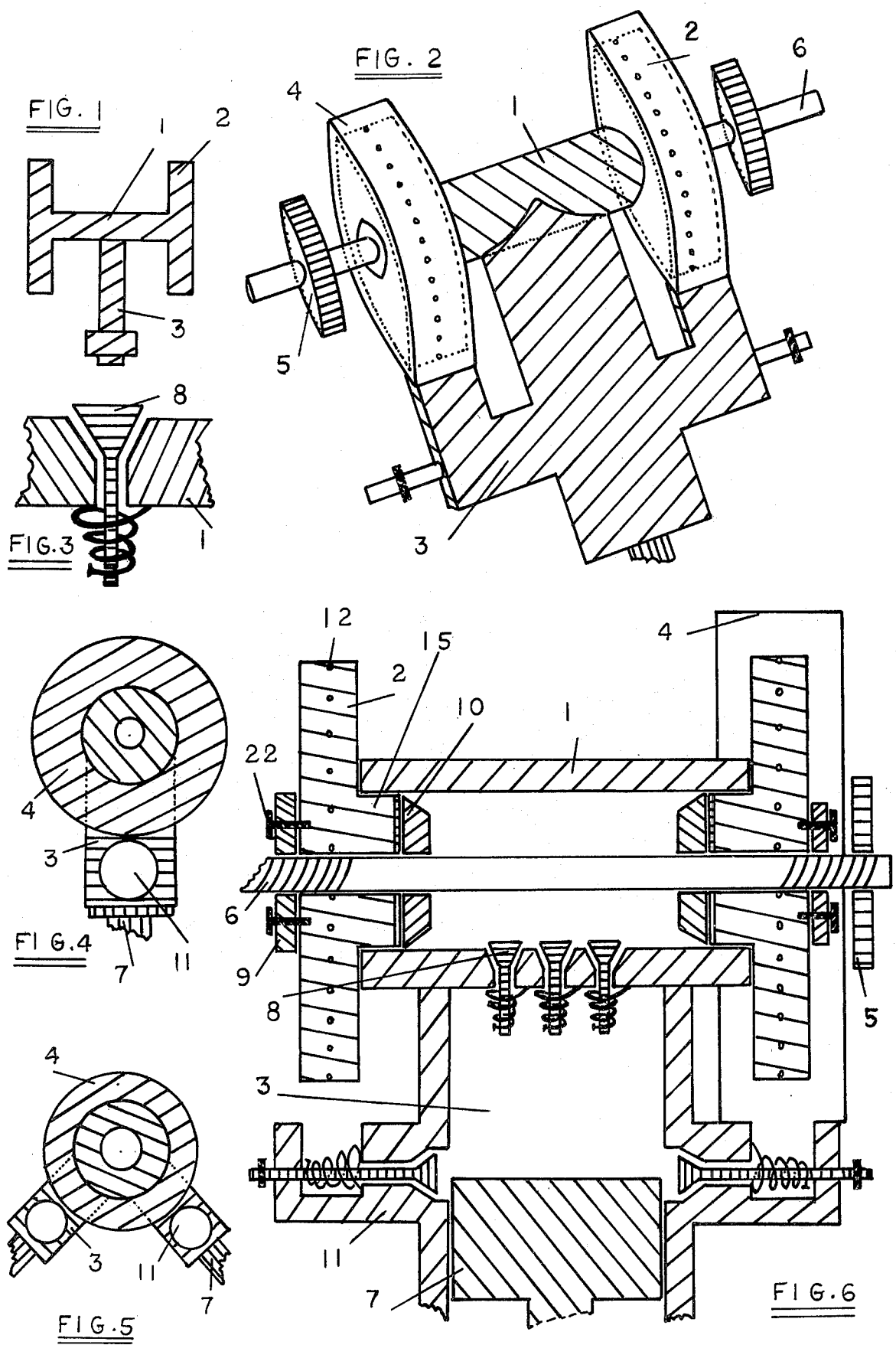

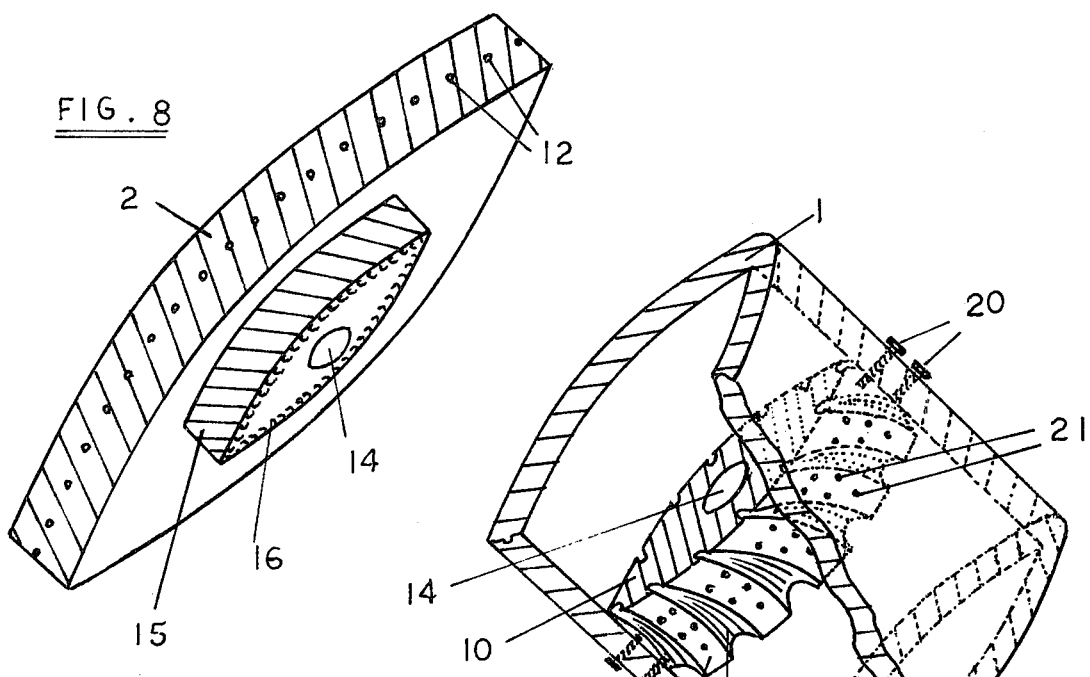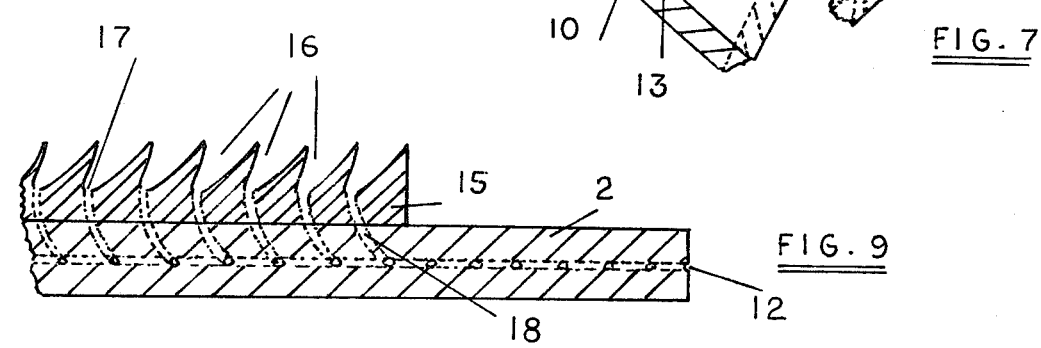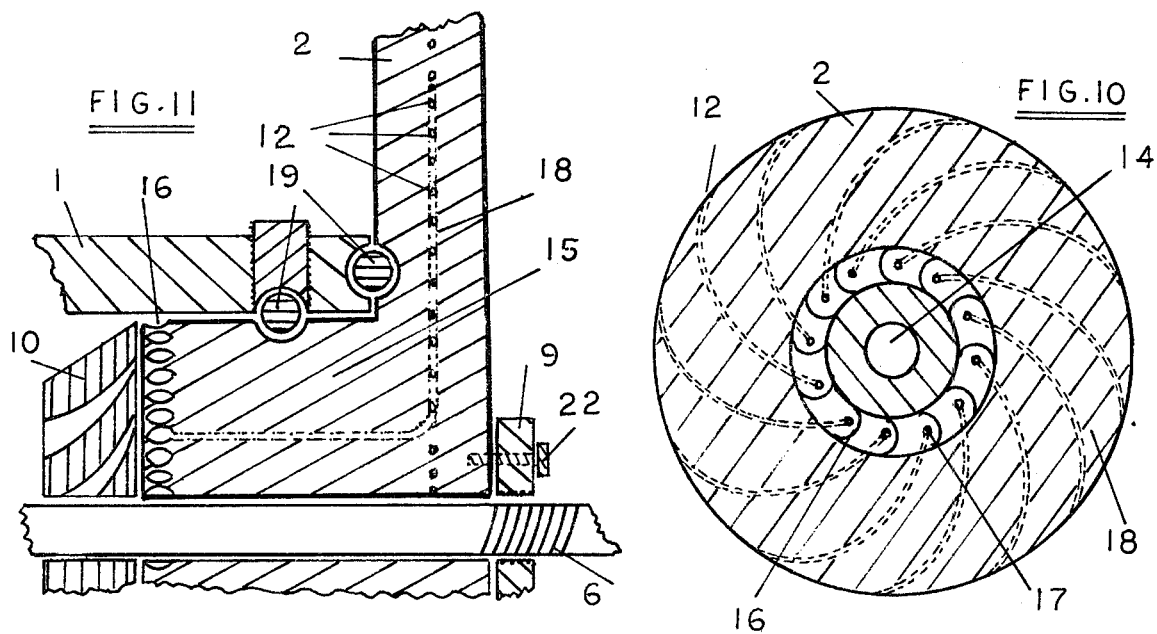

HYDRAULIC CYCLO-JET ENGINE

BACKGROUND OF THE INVENTION

It relates to propelling means, and more specific to a novel method wherein by utilising forces by manual, electrical, or mechanical means, we could obtain a big output power by applying the "Pasqual rule".

DESCRIPTION OF THE PRIOR ART

An example of the units used to obtain the power needed to operate machines, run vehicles, fly helicopters, or navigate boats etc. is the internal combustion engine.

Enough criticism, and lots of developmental work handles its efficiency with regard to its transmission, crank-shaft's mechanism, its weight, gas consumption, and the pollution it causes, and the issues of the dependency on foreign countries.

The rotary engine and all the newly developed versions of it, though it has its advantages; yet it did not escape the same criticism.

The steam engine has its critical problems which are known. But among all the other power units in the market or in research labs, only two of them will be mentioned now for comparison, one of them is the electric car that uses an electric motor, and it is known that it is not that great in its mileage for a fully charged battery, the load it could carry, and the urgent need to provide service stands to do the charging along a certain route. The other unit to be mentioned is the vehicle that drives on a pad of air compressed underneath it, but it is a military type of transportation with limited use.

My new embodiment is a successful attempt to build a power unit very efficient, economical, operates by diversities of methods whether applied manually, electrically, or mechanically, and in a sense; it is almost free of pollution.

The hydraulic cyclo-jet engine I am offering here, utilises the scientific idea on which the hydraulic press is built upon, but this engine is not a hydraulic press. It utilises the principle on which the foot breaks in a car is built upon, but this engine is not a foot break. It also has some similarity to the spinning water sprinkler, in that the jet force resulting from the squirted water that causes the sprinkler to spin, is similar to that jet force which will cause the rotating disc in this engine to twirl and from it we got our source of motion, but after all this engine is not a water or oil sprinkler. Of the three examples mentioned before and with some adjustments, we will see how that little push on the power break results in an enormous power used to halt a heavy dashing vehicle and bring it to a stand, or the compression of oil in a hydraulic press which will enable it to lift heavy loads by the tons or use it to shape materials in a molding machine; will provide forces that could be used to operate a machine or run a vehicle.

SUMMARY OF THE NEW EMBODIMENT

Our engine in discussion which is called the hydraulic cyclo-jet engine needs a flow of compressed oil provided by pumping it manually by hand or foot (similar to what we do when we step on the hydraulic breaks in the car), or the pumping of oil may be provided by coupling the unit with a hydraulic press operated mechanically or electrically, or by electro magnetic means.

The compressed liquid; (as water may be used, but oil is preferred for its higher boiling point, viscosity, and lubricative properties) enters in a master cylinder shaped as a capital letter "T" from its vertical line which must be wide. At the junction of the vertical or pumping line with the master cylinder, there are plurality of one way valves wherein their use is to shut off the oil from pulling backwards with the reverse motion of the compressing piston. The two opposite sides of the master cylinder have conical channels in them, and according to Pasqual's Rule; any pressure exerted on the oil in that cylinder will be transferred as it is to every portion of the oil in that container. And so we expect that the total forces operating on the holes becomes enormous and is sufficient to turn the spinning disc against the load on it, add to that while oil exudates from the spinning disc in a jet manner with an angle, it adds to the inertia of the spinning disc, and so its propelling motion accelerates. Also the jet force insures that the disc spins in one direction.

The new embodiment distinguishes over the prior art in that it may be operated by diversities of methods;
- it has a high efficiency factor;
- the movement is utilised directly from the rotating axle and there is no need to a transmission; or a crank-shaft;
- nothing to be consumed as oil is recirculated; and it is also self lubricating; beside being easy to manufacture, it is simple in construction with less function failures, less pollution, and light in weight.

DESCRIPTION OF THE DRAWINGS

The drawings include 11 figures detailing the construction of the hydraulic cyclo jet engine.

FIG. 1 is a simplified sketch of the engine.

FIG. 2 is an on look view of the whole unit.

FIG. 3 is a cross section view of the valve used in that engine.

FIG. 4 is a side view of the unit and it has one pumping line.

FIG. 5 is a side view of the engine and it has two pumping lines.

FIG. 6 is a cross section view in the engine (a split view).

FIG. 8 shows a view of the rotating disc, and the openings of the ducts in the thickness of that rotating disc, also shown the smaller portion of that rotating disk which fits in the master cylinder.

FIG. 9 shows the poaches or pockets in the smaller portion of the rotating disc, and also a cross section view in a part from it and the draining ducts at the base of the ducts.

FIG. 10 is another front view of the rotating disc.

FIG. 11 is a detailed view of a portion from the rotating disc with relation to the wall of the cylinder and the axle.

FIG. 1: is a simplified view of the new embodiment, where it resembles a capital letter T, and in it 1 is the cylinder, and 3 is the vertical pumping line, and 2 is the rotating disc;

FIG. 2: is the view of our hydraulic cyclo jet engine, and 1 is the cylinder, 2 is the rotating disc, 3 is the pumping line, and 4 is the collecting container, 5 is a gear, and 6 is the axle of the engine;

FIG. 3: is one way valve opened under pressure against its spring, the valve is 8, and 1 is the wall of the cylinder;

FIG. 4: shows that the engine has one pumping line 3, and 7 is the piston, 11 is the feeding line, and 4 is the rotating disc;

FIG. 5: is a side view of the engine where it has two pumping lines 3, and 7 is one piston, 11 is one feeding line, and 4 is the rotating disc;

FIG. 6: is a cross section view in the engine (and one of the collecting containers 4 is removed) and 1 is cylinder wall, and 2 is the rotating disc, 3 is the pumping line, 4 is the collecting container, 5 is a gear, 6 is the rotating axle of the engine, 7 is the pumping piston, 8 is one way valve, 9 is a locking nut and 10 is one side portion of the master cylinder and it has conical channels carved in it, 11 is one of the feeding side lines, 12 is one of the duct's openings in the thickness of the rotating disc, and 15 is the portion of the rotating disc inside the master cylinder's extended walls beyond its sides, and 22 are screws;

FIG. 7: is one of the two sides of the master cylinder 1 in the engine, and the side 10 has conical channels 13 carved in it around its circular surface with an angle, and its center has a hole 14 in which the axle goes through it, and 20 are screws which hold the side portion 10 to the walls of the cylinder 1, and 21 are threaded holes for the screws;

FIG. 8: is the rotating disc, and it has the center hole 14 through which the axle of the engine goes in it, 2 is the portion of the rotating disc outside the master cylinder of the engine and it is big, whereas 15 is the other portion of the rotating disc and it is smaller and fits in the master cylinder's extended walls beyond the cylinder's sides, the face of 15 which is the smaller portion of the rotating disc has poaches or pockets 16 aligned in a circle, and 12 are the openings of the draining ducts in the thickness of the big portion 2 of the rotating disc;

FIG. 9: is a cross section in the rotating disc, 2 is the big portion, 16 is a pocket, 17 is the opening of the draining duct 18, and 12 is the end of the draining duct that opens with an angle on the circumference;

FIG. 10: is a top view of the rotating disc showing the center hole 14, the big portion 2, the pocket 16, the opening 17 in the draining duct which is 18, and 12 is the end of the draining duct that opens with an angle on the circumference;

FIG. 11: is a cross section view in the engine showing the wall of the cylinder 1, and the rotating disc with its two portions 2 and 15, and 10 are the semi conical channels on the cylinder's sides, 16 are the poaches in the rotating disc that faces the conical channels, 6 is the axle, 12 are the draining ducts ends openings in the thickness of the rotating disc, 18 is one of the draining ducts, and as of 19 they are ball bearings to ease the friction between the walls of the cylinder 1, and the rotating disc portions 2 and 15, and 22 are screws.

DETAILED DESCRIPTION OF THE NEW EMBODIMENT

Figure 7:
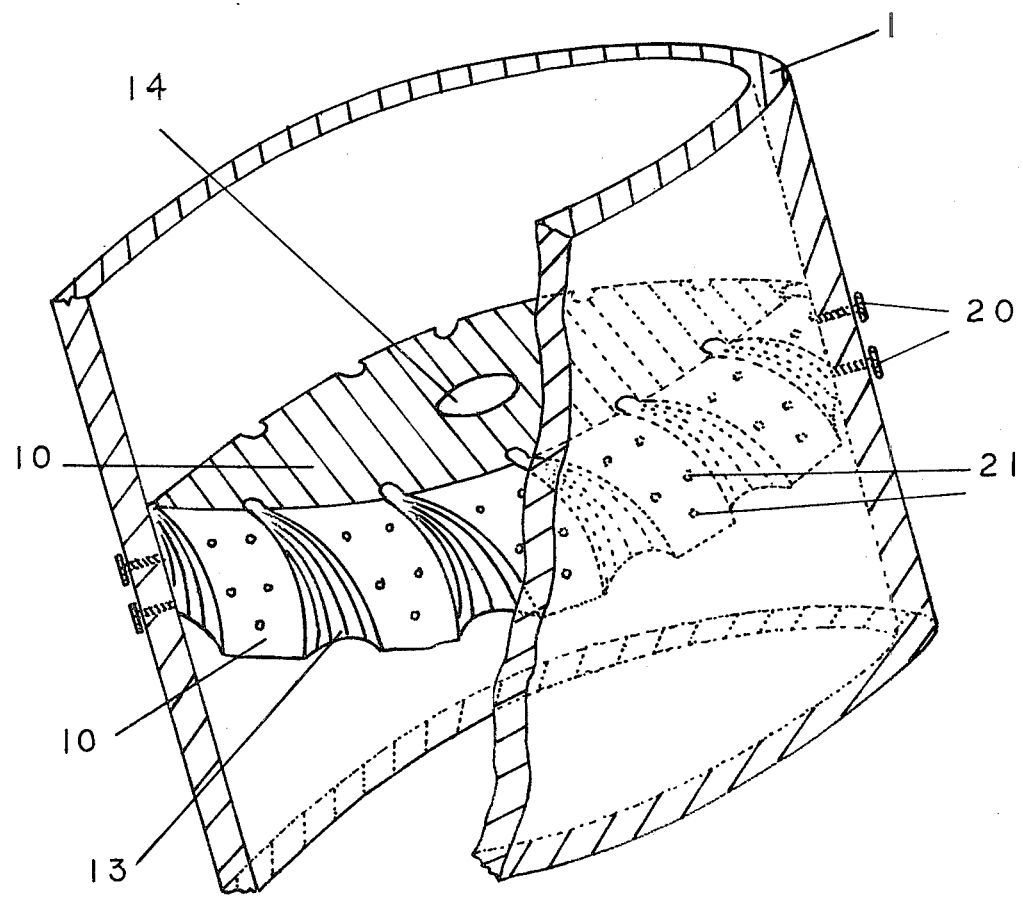
FIG. 7 is a view of one of the two sides of the master cylinder.

The hydraulic cyclo jet engine comprises a master cylinder 1 of the shape of a capital letter "T", FIG. 1. Oil is compressed in this cylinder from its vertical line 3, FIG. 1 by means of a piston 7, FIG. 6, which moves in the pumping line 3, FIG. 6.

At the junction of the pumping line 3, FIG. 6, with the master cylinder 1, FIG. 6, there are plurality of one way valves 8, FIG. 3, which will open under the pressure of the compressed oil, and their use are to shut off the oil from pulling backward with the reverse of the piston 7, FIG. 6. The master cylinder has two assembled sides. The two opposite sides 10, FIG. 6, in the master cylinder are two thick discs 10, FIG. 7, fixed by screws 20, FIG. 7, to the walls of the master cylinder 1, FIG. 7, as the discs have threaded holes in them 21, FIG. 7. There are semi conical channels 13, FIG. 7, carved in the thickness of each side of the master cylinder's sides 10, FIGS. 6, 7 and 11, in a regular manner around their circumference, and they are tilted with an angle on the sides, and their wide base of the holes face the inner side of the master cylinder, and all of them lean to one circular direction. Next to each side 10, FIG. 6, of the master cylinder and outside them there is a rotating disc 2, FIG. 6 or FIG. 8.

The rotating disc has a center hole 14 in it, FIG. 8, through which enters the axle 6, FIG. 6, of the engine. That axle goes also through holes in the sides of the master cylinder. There are locking nuts 9, FIG. 6, to hold the axle in place. The rotating disc, FIG. 8, is of two portions; one of them is big 2, FIG. 8, and the other portion is smaller 15, FIG. 8, and which fits exactly inside the master cylinder 1, FIG. 6 in its extending walls beyond its two sides 1, FIG. 6. The locking nut 9, FIG. 6, is fixed by screws 22, FIG. 6, to the rotating disc 2, FIG. 6 or FIG. 11, so they and the axle together rotate as one piece. The small portion 15 of the rotating disc, FIG. 8, which faces the outer side in the master cylinder 10, FIG. 7; has got pockets in it 16, FIG. 8. These pockets are arranged in a circle on the circumference 16, FIG. 10, and they are dense, next to one another, and all of them open in one circular direction.

In the bottom of each pocket 16, FIG. 9; there is an opening 17, FIG. 9 of a draining duct 18, FIG. 9, and this duct crosses the rotating disc 15, FIG. 11, and then bends sharply and with a curvature it opens with an angle 18, FIG. 10, in the thickness of the big portion 2 of the rotating disc, FIG. 11 or FIG. 8. The draining duct has end openings 12, FIGS. 10 or 11. It should be noticed that while the pockets 16, FIG. 9, lean to the same direction in a circular manner among themselves, on the other hand they open opposite the direction of openings; of the conical channels holes; on the outer surface of the master cylinder's sides, FIG. 7.

The draining ducts should be narrow, and the pockets small, and the diameter of the big portion in the rotating disc should be large as possible. In addition to that; the ratio of the surface area of the base of the conical channel to the area of the narrow end of the cone 13, FIG. 7, should also be big; since upon all these former factors, the efficiency of the engine depends upon.

If an amount of oil is compressed in the master cylinder 1, FIG. 6, from its pumping line 3, FIG. 6, then oil will have no passage outside the cavity except from the conical channels 13, FIG. 7; as the one way valves 8, FIG. 3, will open only against the pressure of the compression of the piston 7, FIG. 6.

To provide smoothness of motion to the engine, it may be provided with two pumping lines 3, FIG. 5; or even more; to take over the pumping when one piston is in its reverse motion.

As the channels in the master cylinder's sides are conical in shape, so according to "Pasqual's Rule" the pressure with which oil leaves the narrow portions of the cones will be equivalent to the pressure of pumping exerted by the piston × area of base of the cone/area of top of the cone × number of conical channels on the sides, and so the total forces operating from the multiple of the conical channels will be enormous. When oil leaves the conical channels it encounters the rotating disc with its pockets, and so oil will force the rotating disc to spin to release the pressure on it. The draining of oil from the draining openings 17, FIG. 9, to the draining ducts 18, FIG. 11, and out from the ends of the draining ducts 12, FIG. 10, on the rotating disc 2, FIG. 10, will resemble a jet thrust, and because the ducts are positioned with an angle on the circumference-see FIGS. 10-18 so the forces of the thrust will add an extra acceleration to the rotating disc, and also restricts its direction of rotation.

Oil is collected by a collecting container 4, FIG. 6, which is connected to the feeding lines 11, FIG. 6, and they also have in each; a one way valve 8, FIG. 3.

For direct utilization of the motion from the revolving axle of the engine 6, FIG. 6, which is tied together with screws 22, FIG. 6, to the locking nut 9, FIG. 6, a gear 5, FIG. 2, may be fixed to it.

To lower the friction among the rotating parts, there are bearing balls 19, FIG. 11, to support the rotating disc's portions 2 and 15, FIG. 11, against the walls of the master cylinder 1, FIG. 11.

What I claim:

1. A hydraulic cyclo jet engine which comprises: a master cylinder of the shape of the capital letter T, a compressing piston, said piston moves in the vertical line of that T shaped cylinder, two assembled sides for that master cylinder, the sides are fixed to the master cylinder by screws, each one of these sides has semi conical carvings in it, these semi conical carvings are carved in a regular manner around the circumference of said side and they lean to one circular direction, two rotating discs, and each rotating disc has a center hole in it, the rotating disc is of two portions, one portion is small and the other portion is big, the small portion of the rotating disc has plurality of pockets on it, at the bottom of each pocket there is a draining duct, the end of each draining duct opens in the thickness of the bigger portion of the rotating disc with an angle, each of the small portions of the rotating discs fits exactly inside the master cylinder next to its assembled sides, an axle and nuts, that axle goes through holes in the sides and in the rotating discs, the nuts are screwed on the axle to lock the parts together, plurality of one way valves, these valves are positioned at the junction of the pumping vertical line and the cylinder, two collecting containers, with one collecting container for one rotating disc.

2. A hydraulic cyclo jet engine according to claim 1 wherein these semi-conical carvings around the circumference of those asembled sides are angled in a uniform manner in one direction around the circumference.

* * * * *